United States Patent
Kawamura et al.

(10) Patent No.: US 11,398,327 B2
(45) Date of Patent: Jul. 26, 2022

(54) ALLOY FOR R-T-B BASED PERMANENT MAGNET AND METHOD OF PRODUCING R-T-B BASED PERMANENT MAGNET

(71) Applicant: TDK CORPORATION, Tokyo (JP)

(72) Inventors: Hiroki Kawamura, Tokyo (JP); Hidetake Kitaoka, Tokyo (JP); Makoto Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 22 days.

(21) Appl. No.: 16/827,851

(22) Filed: Mar. 24, 2020

(65) Prior Publication Data
US 2020/0312491 A1    Oct. 1, 2020

(30) Foreign Application Priority Data
Mar. 29, 2019   (JP) .............................. JP2019-066366

(51) Int. Cl.
| | |
|---|---|
| H01F 1/057 | (2006.01) |
| H01F 41/02 | (2006.01) |
| C22C 38/16 | (2006.01) |
| C22C 38/10 | (2006.01) |
| C22C 38/06 | (2006.01) |
| C22C 38/00 | (2006.01) |
| C22C 38/14 | (2006.01) |

(52) U.S. Cl.
CPC ......... *H01F 1/0576* (2013.01); *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *H01F 1/0577* (2013.01); *H01F 41/0266* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 2006/0137767 A1 | 6/2006 | Yamamoto et al. | |
| 2016/0225501 A1* | 8/2016 | Miwa | H01F 1/0577 |
| 2019/0295752 A1* | 9/2019 | Kitaoka | C22C 38/002 |
| 2020/0303097 A1* | 9/2020 | Iwasaki | H01F 1/0577 |
| 2020/0303099 A1* | 9/2020 | Fujiwara | C22C 30/02 |
| 2021/0296029 A1* | 9/2021 | Kawamura | C22C 38/16 |

FOREIGN PATENT DOCUMENTS

| | | | |
|---|---|---|---|
| JP | 2006-210893 A | 8/2006 | |
| JP | 2016184735 | * 10/2016 | |

OTHER PUBLICATIONS

English language machine translation of JP2016184735 to Fujikawa. Generated Dec. 2, 2021. (Year: 2021).*
English language machine translation of JP2006210893 to Yamamoto. Generated Dec. 2, 2021. (Year: 2021).*

* cited by examiner

*Primary Examiner* — Brian D Walck
(74) *Attorney, Agent, or Firm* — Oliff PLC

(57) ABSTRACT

An alloy for R-T-B based permanent magnet in which R is a rare earth element, T is a combination of Fe and Co, and B is boron. R includes one or more selected from Nd, Pr, Dy, and Tb. The alloy for R-T-B based permanent magnet includes M and C. M is one or more selected from Al, Cu, Zr, and Ga. Relative to 100 mass % of the alloy for R-T-B based permanent magnet, a total content of Nd, Pr, Dy, and Tb is 28.00 mass % or more and 34.00 mass % or less, Co content is 0.05 mass % or more and 3.00 mass % or less, B content is 0.70 mass % or more and 0.95 mass % or less, C content is 0.12 mass % or more and 0.19 mass % or less, a total content of M is more than 0 mass % and 4.00 mass % or less, and Fe is a substantial balance.

15 Claims, No Drawings

ALLOY FOR R-T-B BASED PERMANENT MAGNET AND METHOD OF PRODUCING R-T-B BASED PERMANENT MAGNET

TECHNICAL FIELD

The present invention relates to an alloy for R-T-B based permanent magnet and a method of producing the R-T-B based permanent magnet.

BACKGROUND

Patent Document 1 discloses an Nd—Fe—B based rare earth permanent magnet raw material. It discloses that by containing at least two of $M_1$-B based compound, $M_1$-B—Cu based compound, and $M_1$-C based compound in the material, and by further precipitating R oxide, an abnormal grain growth is suppressed. Thereby, an optimum sintering temperature range becomes wider. M1 is one or more of Ti, Zr, and Hf.

[Patent Document 1] JP Patent Application Laid Open No. 2006-210893

SUMMARY

Currently, there is a demand for stable production of an R-T-B based permanent magnet having improved magnetic properties (magnetic flux density Br and coercive force Hcj) and having a high squareness ratio Hk/Hcj in a wide sintering temperature range.

An object of the present invention is to provide an alloy for R-T-B based permanent magnet having improved magnetic properties and a wide temperature range suitable for sintering.

The temperature range suitable for sintering is a temperature range capable of obtaining the R-T-B based permanent magnet having a sufficiently high Hk/Hcj after sintering. Hereinafter, the temperature range suitable for sintering may be simply referred as a sintering temperature range.

In response to the object, the alloy for R-T-B based permanent magnet according to one aspect is an alloy for R-T-B based permanent magnet in which R is a rare earth element, T is a combination of Fe and Co, and B is boron, wherein R comprises one or more selected from Nd, Pr, Dy, and Tb, the alloy for R-T-B based permanent magnet comprises M and C, M is one or more selected from Al, Cu, Zr, and Ga, and relative to 100 mass % of the alloy for R-T-B based permanent magnet, a total content of Nd, Pr, Dy, and Tb is 28.00 mass % or more and 34.00 mass % or less, Co content is 0.05 mass % or more and 3.00 mass % or less, B content is 0.70 mass % or more and 0.95 mass % or less, C content is 0.12 mass % or more and 0.19 mass % or less, a total content of M is more than 0 mass % and 4.00 mass % or less, and Fe is a substantial balance.

The alloy for R-T-B based permanent magnet of the present invention shows improved magnetic properties and a wide sintering temperature range by having the above properties.

C content may be 0.12 mass % or more and 0.15 mass % or less.

Ga content may be 0.20 mass % or more and 1.00 mass % or less.

Zr content may be 0.10 mass % or more and 1.00 mass % or less.

The alloy for R-T-B based permanent magnet may not substantially include a heavy rare earth element.

The method of producing the R-T-B based permanent magnet includes a step of using the alloy for R-T-B based permanent magnet.

DETAILED DESCRIPTION

Hereinafter, an embodiment of the present invention is explained.

<Alloy for R-T-B Based Permanent Magnet>

Described is an alloy for R-T-B based permanent magnet according to the present embodiment.

According to the alloy for R-T-B based permanent magnet of the present embodiment, R is one or more selected from rare earth elements. As R, the alloy includes one or more selected from Nd, Pr, Dy, and Tb. In case of producing the R-T-B based permanent magnet using the alloy for R-T-B based permanent magnet of the present embodiment, the alloy may include Nd and/or Pr as R from the viewpoints of the production cost and suitably controlling the magnetic properties of the R-T-B based permanent magnet. Moreover, R may include both light rare earth elements and heavy rare earth elements to improve Hcj. The content of the heavy rare earth elements is not particularly limited, and it may be substantially free of the heavy rare earth elements. Specifically, the phrase "substantially free of the heavy rare earth elements" means that the content of heavy rare earth elements is less than 0.1 mass % (including 0 mass %) with respect to 100 mass % of the alloy for R-T-B based permanent magnet.

According to the present embodiment, T is a combination of Fe and Co, and B is boron. Furthermore, the alloy for R-T-B based permanent magnet of the present embodiment includes M and C. M is one or more selected from Al, Cu, Zr, and Ga.

Hereinafter, the R-T-B based permanent magnet produced using the alloy for R-T-B based permanent magnet of the present embodiment may be referred as the R-T-B based permanent magnet according to the present embodiment.

The total content of Nd, Pr, Dy, and Tb in the alloy for R-T-B based permanent magnet of the present embodiment is 28.00 mass % or more 34.00 mass % or less with respect to 100 mass % of the alloy for R-T-B based permanent magnet. It may be 31.00 mass % or more and 32.00 mass % or less. If the total content of Nd, Pr, Dy, and Tb is too small, the main phase grains of the R-T-B based permanent magnet according to the present embodiment will not be generated sufficiently. Therefore, α-Fe or the like having a soft magnetism is precipitated, and Hcj decreases. If the total content of Nd, Pr, Dy and Tb is too large, the volume ratio of the main phase grains of the R-T-B based permanent magnet according to the present embodiment decreases, and Br decreases. Rare earth elements other than Nd, Pr, Dy, and Tb, may not be substantially contained except as inevitable impurities.

B content in the alloy for R-T-B based permanent magnet according to the present embodiment is 0.70 mass % or more and 0.95 mass % or less. It may be 0.80 mass % or more and 0.92 mass % or less. If B content is too small, the R-T-B based permanent magnet according to the present embodiment shows a low Hk/Hcj and a narrow sintering temperature range. As the sintering temperature range decreases, the production stability also lowers. If B content is too large, the R-T-B based permanent magnet according to the present embodiment shows a low Hcj. Furthermore, an abnormal grain growth is likely to occur.

Co content in the alloy for R-T-B based permanent magnet according to the present embodiment is 0.05 mass % or more and 3.00 mass % or less. It may be 0.50 mass % or more and 2.00 mass % or less. If Co content is too small, the R-T-B based permanent magnet according to the present embodiment shows a low corrosion resistance. If Co content is too large, the alloy for R-T-B based permanent magnet according to the present embodiment tends to cost more.

The total content of M in the alloy for R-T-B based permanent magnet according to the present embodiment is not particularly limited, and for instance, it may be 0 mass % or more and 4.00 mass % or less.

The alloy for R-T-B based permanent magnet according to the present embodiment may contain Cu or may not contain Cu depending on needs. Cu content may be 0.10 mass % or more and 0.50 mass % or less. The corrosion resistance of the R-T-B based permanent magnet according to the present embodiment is likely to decrease as Cu content decreases. Br of the R-T-B based permanent magnet according to the present embodiment is likely to decrease as Cu content increases.

The alloy for R-T-B based permanent magnet according to the present embodiment may contain Ga or may not contain Ga depending on needs. Ga content may be 0.20 mass % or more and 1.00 mass % or less, or it may be 0.20 mass % or more and 0.80 mass % or less. The corrosion resistance of the R-T-B based permanent magnet according to the present embodiment is likely to decrease as Ga content decreases. Br of the R-T-B based permanent magnet according to the present embodiment is likely to decrease as Ga content increases.

The alloy for R-T-B based permanent magnet according to the present embodiment may contain Al or may not contain Al depending on needs. Al content may be 0.10 mass % or more and 0.50 mass % or less. Hcj and the corrosion resistance of the R-T-B based permanent magnet according to the present embodiment are likely to decrease as Al content decreases. Br of the R-T-B based permanent magnet according to the present embodiment is likely to decrease as Al content increases.

The alloy for R-T-B based permanent magnet according to the present embodiment may contain Zr or may not contain Zr depending on needs. Zr content may be 0.10 mass % or more and 1.00 mass % or less. It may be 0.10 mass % or more and 0.80 mass % or less. The corrosion resistance and the sinterability of the R-T-B based permanent magnet according to the present embodiment are likely to decrease as Zr content decreases. Br of the R-T-B based permanent magnet according to the present embodiment is likely to decrease as Zr content increases.

The alloy for R-T-B based permanent magnet according to the present embodiment contains C. C content in the R-T-B based permanent magnet according to the present embodiment is 0.12 mass % or more and 0.19 mass % or less. It may be 0.12 mass % or more and 0.15 mass % or less, or may be 0.13 mass % or more and 0.15 mass % or less. By having C content within the above range, the magnetic properties of the R-T-B based permanent magnet according to the present embodiment are improved and the sintering temperature range capable of obtaining a high Hk/Hcj is widened. If C content is too small, the sintering temperature range capable of obtaining a high Hk/Hcj in the R-T-B based permanent magnet according to the present embodiment becomes narrow. Particularly when the sintering temperature is low, it becomes difficult to obtain a high Hk/Hcj. If C content is too large, Hcj is likely to decrease.

C content in the alloy for R-T-B based permanent magnet may be measured for example by a combustion in oxygen airflow—infrared absorption method.

Contents of Fe and inevitable impurities in the alloy for R-T-B based permanent magnet of the present embodiment are a substantial balance in the components of the alloy for R-T-B based permanent magnet.

<Method of Producing R-T-B Based Permanent Magnet>

Below is an example of a method of producing the R-T-B based permanent magnet according to the present embodiment. The method of producing the R-T-B based permanent magnet (the R-T-B based sintered magnet) according to the present embodiment includes following steps.

(a) An alloy preparation step wherein the alloy for R-T-B based permanent magnet (a raw material alloy) is prepared;

(b) a pulverization step wherein the raw material alloy is pulverized;

(c) a compacting step wherein the obtained alloy powder is compacted;

(d) a sintering step wherein a green compact is sintered to obtain the R-T-B based permanent magnet;

(e) an aging treatment step wherein the R-T-B based permanent magnet is carried out with an aging treatment;

(f) a cooling step cooling the R-T-B based permanent magnet;

(g) a machining step wherein the R-T-B based permanent magnet is machined;

(h) a grain boundary diffusing step wherein the heavy rare earth element is diffused into the grain boundaries of the R-T-B based permanent magnet; and (i) a surface treatment step wherein the R-T-B based permanent magnet is surface treated.

[Alloy Preparation Step]

First, the alloy for R-T-B based permanent magnet according to the present embodiment is prepared (an alloy preparation step). Hereinafter, a strip casting method will be described as an example of the alloy preparation step, but the alloy preparation step is not limited thereto.

Raw material metals corresponding to a composition of the alloy for R-T-B based permanent magnet according to the present embodiment is prepared, then the prepared raw material metals are melted in vacuum or in inert gas atmosphere such as Ar gas and the like. The melted raw material metals are casted to produce the alloy for R-T-B based permanent magnet (raw material alloy) according to the present embodiment. According to the present embodiment, a one-alloy method is described, however, a two-alloy method in which two alloys that is a first alloy and a second alloy are mixed to produce the raw material powder may also be used.

A type of the raw material metals are not particularly limited. For example, rare earth metals or an alloy of the rare earth metals, pure iron, pure cobalt, ferro-boron, compounds and alloys thereof, and the like can be used. The method of casting the raw material metals are not particularly limited. For example, an ingot casting method, a strip casting method, a book molding method, a centrifugal casting method, and the like may be mentioned. In case solidification segregation exist in the obtained raw material alloy, a homogenization treatment (a liquifying treatment) may be carried out if needed.

[Pulverization Step]

After the raw material alloy is produced, the raw material alloy is pulverized (a pulverization step). The pulverization step may be carried out in two steps including a coarse pulverization step pulverizing until a particle size is several hundred m to several mm or so and a fine pulverization step pulverizing until a particle size is several m or so. The pulverization step may be carried out in one step which is only the fine pulverization step.

(Coarse Pulverization Step)

The raw material alloy is coarsely pulverized until a particle size is several hundred m to several mm or so (a coarse pulverization step). Thereby, a coarsely pulverized powder of the raw material alloy is obtained. For example, the coarse pulverization can be carried out by storing hydrogen in the raw material alloy, then releasing hydrogen using difference in a hydrogen storage amount between the different phases, and dehydrogenation is carried out which causes a self-collapsing like pulverization (hydrogen storage pulverization). The dehydrogenation conditions are not particularly limited, and for example, dehydrogenation is performed at 300 to 650° C. in an argon flow or in a vacuum.

The coarse pulverization step is not limited to the above hydrogen storage pulverization. The coarse pulverization step may be carried out by using a coarse pulverizer such as a stamp mill, a jaw crusher, a brown mill, and the like in inert gas atmosphere.

In order to obtain the R-T-B based permanent magnet showing high magnetic properties, each step from the coarse pulverization step to the sintering step which is described below is preferably carried out in an atmosphere of a low oxygen concentration. The oxygen concentration is regulated for example by controlling an atmosphere of each production step. If the oxygen concentration of each production step is high, a rare earth element in the alloy powder obtained by pulverizing the raw material alloy is oxidized and oxides of R are formed. The oxides of R precipitate as oxides of R in the grain boundaries since these are not reduced during sintering. As a result, Br of the obtained R-T-B based permanent magnet decreases. Therefore, for example, each step (a fine pulverization step and a compacting step) is preferably carried out in an atmosphere having an oxygen concentration of 100 ppm or less.

(Fine Pulverization Step)

After coarsely pulverizing the raw material alloy, the obtained coarsely pulverized powder of the raw material alloy is finely pulverized until the average particle size is several μm or so (the fine pulverization step). Thereby, the finely pulverized powder of the raw material alloy is obtained. By finely pulverizing the coarsely pulverized powder, the finely pulverized powder can be obtained. D50 of the particles included in the finely pulverized powder is not particularly limited. For instance, D50 may be 2.0 μm or more to 4.5 μm or less, and 2.5 μm or more to 3.5 μm or less. Hcj of the R-T-B based permanent magnet according to the present embodiment improves as D50 decreases. The abnormal grain growth tends to occur during the sintering step, and the upper limit of the sintering temperature range is lowered. As D50 increases, the abnormal grain growth is less likely to occur in the sintering step and the upper limit of the sintering temperature range becomes higher. However, Hcj of the R-T-B based permanent magnet according to the present embodiment tends to decrease.

The fine pulverization is carried out by further pulverizing the coarsely pulverized powder using a fine pulverizer such as a jet mill, a ball mill, a vibrating mill, a wet attritor, and the like while suitably regulating the conditions such as a pulverization time and the like. Hereinafter, a jet mill will be described. A jet mill is a fine pulverizer wherein high pressure inert gas (for example, He gas, $N_2$ gas, or Ar gas) is released from a narrow nozzle to generate a high speed gas flow, and this high speed gas flow accelerates the coarsely pulverized powder of the raw material alloy and makes the coarsely pulverized powder of raw material alloy to collide against each other or collide the coarsely pulverized powder of the raw material alloy with a target or a container wall.

When finely pulverizing the coarsely pulverized powder of the raw material alloy, a pulverization aid may be added. A type of the pulverization aid is not particularly limited. For example, an organic lubricant or a solid lubricant may be used. Examples of the organic lubricant include oleic amide, lauric amide, and zinc stearate, etc. Examples of the solid lubricant include graphite. A finely pulverized powder, which can easily orient when a magnetic field is applied in the compacting step, can be obtained by adding the pulverization aid. Either one of the organic lubricant or the solid lubricant may be used, or both may be used together. This is because the degree of orientation may decrease particularly when the solid lubricant is only used.

[Compacting Step]

The finely pulverized powder is compacted into a desired shape (a compacting step). The compacting step is carried out by filling the finely pulverized powder in a press mold placed in the magnetic field and then pressurizing, thereby the finely pulverized powder is compacted and a green compact is obtained. By compacting while applying the magnetic field, compacting is carried out in a state where the crystal axis of the finely pulverized powder is oriented in a specific direction. Hence the R-T-B based permanent magnet having a higher magnetic anisotropy is obtained. A compacting aid may be added. A type of the compacting aid is not particularly limited. The same lubricant as the pulverization aid may be used. The pulverization aid may also serve as the compacting aid.

A pressure of 30 MPa or more to 300 MPa or less may be applied while compacting. The applied magnetic field may be 1000 kA/m or more to 1600 kA/m or less. The magnetic field is not limited to a static magnetic field, and it may be a pulse magnetic field. A static magnetic field and a pulse magnetic field can be used together.

As the compacting method, besides dry compacting in which the finely pulverized powder is directly compacted as described in above, wet compacting can be used in which a slurry obtained by dispersing the finely pulverized powder in a solvent such as oil is compacted.

A shape of the green compact obtained by compacting the finely pulverized powder is not particularly limited, and for example it may be a rectangular parallelepiped shape, a planar shape, a columnar shape, a ring shape, a C-shape etc., according to the desired shape of the R-T-B based permanent magnet.

[Sintering Step]

The green compact having a desired shape obtained by compacting in a magnetic field is sintered in a vacuum or in inert gas atmosphere, and the R-T-B based permanent magnet is obtained (a sintering step). A holding temperature during sintering needs to be regulated depending on various conditions such as a composition, a pulverization method, a difference between particle size and particle size distribution, and the like. The holding temperature is a temperature at which the abnormal grain growth does not occur and Hk/Hcj is sufficiently high. The holding temperature is not particularly limited, and it may be 1000° C.° or more and 1150° C.° or less, and may be 1050° C.° or more and 1130° C.° or less. The holding time is not particularly limited. It may be 2 hours or more and 10 hours or less, and may be 2 hours or more and 8 hours or less. A production efficiency improves as the holding time decreases. The atmosphere while holding the temperature is not particularly limited. For example, it may be an inert gas atmosphere, a vacuum atmosphere of less than 100 Pa, or a vacuum atmosphere of less than 10 Pa. The heating rate up to the holding temperature is not particularly limited. By sintering, the finely pulverized powder undergoes liquid sintering and the R-T-B based permanent magnet (a sintered body of the R-T-B based permanent magnet) according to the present embodiment is obtained. Although the cooling rate after obtaining the sintered body, which is obtained by sintering the green compact, is not particularly limited, and the sintered body may be quenched in order to improve the production efficiency. It may be quenched at a rate of 30° C./min. or more.

[Aging Treatment Step]

After sintering the green compact, the aging treatment is carried out to the R-T-B based permanent magnet (an aging treatment step). After sintering, the obtained R-T-B based permanent magnet is maintained under a temperature lower than the temperature in the sintering step, thereby the aging treatment of the R-T-B based permanent magnet is carried out. Hereinafter, the case of carrying out the aging treatment in two steps that is the first aging treatment and the second aging treatment will be described, however, either one of the aging treatments may be carried out or aging treatments in three steps or more may be carried out.

The holding temperature and the holding time at each aging treatment are not particularly limited. For instance, the first aging treatment can be carried out at a holding temperature of 800° C. or more and 900° C. or less for a holding time of 30 minutes or more and 4 hours or less. The temperature increasing rate up to the holding temperature may be 5° C./min or more and 50° C./min or less. The atmosphere during the first aging treatment may be an inert gas atmosphere (e.g. He gas, Ar gas) having a pressure equal to or higher than atmospheric pressure. The second aging treatment may be performed under the same conditions as the first aging treatment except that the holding temperature may be 450° C. or more to 550° C. or less. The aging treatment can improve the magnetic properties of the R-T-B based permanent magnet. The aging treatment step may be carried out after the machining step mentioned below.

[Cooling Step]

After carrying out the aging treatments (the first aging treatment and the second aging treatment) to the R-T-B based permanent magnet, the R-T-B based permanent magnet is quenched in an inert gas atmosphere (a cooling step). Thereby, the R-T-B based permanent magnet of the present embodiment can be obtained. The cooling rate is not particularly limited, and it may be 30° C./min or more.

[Machining Step]

The obtained R-T-B based permanent magnet may be machined into a desired shape depending on the needs (a machining step). The method of machining may be, for example, a shaping process such as cutting, grinding, and the like; a chamfering process such as barrel polishing, and the like.

[Grain Boundary Diffusion Step]

A step for diffusing a heavy rare earth element may be further carried out to the grain boundaries of the machined R-T-B based permanent magnet (a grain boundary diffusion step). The method of grain boundary diffusion is not particularly limited. For example, the grain boundary diffusion may be carried out by heat treating the R-T-B based permanent magnet which is after adhering the compounds including heavy rare earth elements to the surface of the R-T-B based permanent magnet by coating, a vapor deposition, etc. The grain boundary diffusion may be carried out by heat treating the R-T-B based permanent magnet in an atmosphere including a vapor of heavy rare earth elements. By carrying out the grain boundary diffusion, Hcj of the R-T-B based permanent magnet can be further improved.

[Surface Treatment Step]

The R-T-B based permanent magnet is obtained by the above mentioned steps, and it may be carried out with a surface treatment such as a plating, a resin coating, an oxidation treatment, a chemical conversion treatment, and the like (a surface treatment step). Thereby, the corrosion resistance can be further improved.

The present embodiment carries out the machining step, the grain boundary diffusion step, and the surface treatment step, however, these steps may not be necessary.

The R-T-B based permanent magnet of the present embodiment obtained as above becomes the R-T-B based permanent magnet having preferable magnetic properties, a wide sintering temperature range capable of attaining a high Hk/Hcj, and a high production stability.

The above effects can be obtained when the alloy for R-T-B based permanent magnet has a specific composition, and particularly when contains a predetermined amount of C. The reason for this is as follows.

In case B content is smaller than a stoichiometric ratio of an $R_2T_{14}B$ phase, the R-T-B based permanent magnet after sintering shows a high Hcj.

When B content in the alloy for R-T-B based permanent magnet before sintering is less than the stoichiometric ratio of the $R_2T_{14}B$ phase, an $R_6T_{13}M$ phase is formed due to the lack of elements entering the B site of the $R_2T_{14}B$ phase. When the temperature increases in the sintering step, the $R_6T_{13}M$ phase is decomposed into an R-M compound and an α-Fe phase, and the α-Fe phase will be taken into the crystal grains of the $R_2T_{14}B$ phase during the grain growth. The presence of the α-Fe phase in the sintered body after sintering decreases Hk/Hcj. It is possible to reduce the amount of the α-Fe phase by increasing the holding temperature or increasing the sintering time during sintering. However, an abnormal grain growth tends to occur when the holding temperature increases during sintering. The magnetic properties deteriorate when the abnormal grain growth occurs. The productivity is reduced when the sintering time becomes longer. Therefore, when B content is smaller than the stoichiometric ratio, it is difficult to stably improve Hk/Hcj.

The alloy for R-T-B based permanent magnet of the present embodiment includes C. When the alloy for R-T-B based permanent magnet contains C, C is substituted at the B site of the $R_2T_{14}B$ phase. Therefore, the $R_6T_{13}M$ phase can be restricted from forming, the α-Fe phase is less likely to be generated, and Hk/Hcj is less likely to decrease even if the holding temperature during sintering is low. Furthermore, since the R-T-B based permanent magnet obtained at the end has B content smaller than the stoichiometric ratio, it is easy to obtain high magnetic properties.

It is possible to change C content in the R-T-B based permanent magnet obtained at the end, for example, by varying the contents of the pulverization aid and the compacting aid. Even if C is added as the pulverization aid or the compacting aid, the α-Fe cannot be restricted from forming since the $R_6T_{13}M$ phase is formed in the alloy before sintering.

The present invention is not limited to the above embodiments and can be varied within the scope of the present invention.

Examples

Next, the present invention is described based on specific examples, however, the present invention is not limited thereto.

Experiment 1

(Alloy Preparation Step)

In an alloy preparation step, a raw material alloy having the alloy composition shown in Table 1 was prepared. T.RE means a total content of Nd, Pr, Dy, and Tb. A total content of Dy and Tb in each alloy composition was less than 0.01 mass %.

A raw material metal having a predetermined element was prepared. As the raw material metal, a simple element shown in Table 1 or a compound such as alloy and the like including the element shown in Table 1 was suitably selected and the raw material alloy was prepared.

Next, the raw material metal was weighed so that it satisfied an alloy composition shown in Examples and Comparative Examples of Table 1, then the raw material alloy was prepared by a strip casting method. Carbon content was controlled by changing the ratio of pig iron used in the raw material metal.

For each Example and Comparative example, a compositional analysis was carried out by a fluorescent X-ray spectroscopy, an induction coupled plasma analysis method (ICP method), and a gas analysis method to confirm that the composition of the raw material alloy satisfied the composition as shown in Table 1. In particular, carbon content was measured by a combustion in oxygen airflow-infrared absorption method.

(Pulverization Step)

In a pulverization step, the raw material alloy obtained from the preparation step was pulverized to obtain an alloy powder. The pulverization was performed in two steps of a coarse pulverization and a fine pulverization. The coarse pulverization was performed by a hydrogen storage pulverization. After hydrogen was stored in the raw material alloy, dehydrogenation was performed at 300 to 600° C. in an argon flow or in vacuum. By carrying out the coarse pulverization, an alloy powder having a particle size of a several hundred μm to a several mm or so was obtained.

0.10 parts by weight of oleic acid amide as the pulverization aid was added and mixed to 100 parts by weight of alloy powder obtained by the coarse pulverization, and the fine pulverization was performed using a jet mill. Nitrogen gas was used in the jet mill. The fine pulverization was performed until D50 of the alloy powder was approximately 3.0 μm.

(Compacting Step)

In a compacting step, a green compact was obtained by compacting the alloy powder obtained from the pulverization step in the magnetic field. The alloy powder was filled in a press mold, then pressure was applied while applying the magnetic field by electromagnets, thereby compacting was performed. The magnitude of the applied magnetic field was 1200 kA/m. The applied pressure during compacting was 40 MPa.

(Sintering Step)

In a sintering step, a sintered body was obtained by sintering the obtained green compact. Three types of sintered bodies were obtained by changing a holding temperature during sintering to 1050° C., 1060° C., and 1070° C. for each Example and Comparative Example. A temperature increasing rate up to the holding temperature was 8.0° C./min and a holding time was 4.0 hours. The cooling rate when cooled from the holding temperature to the room temperature was 50° C./min. The atmosphere during sintering was a vacuum atmosphere or an inert gas atmosphere.

(Aging Treatment Step)

In the aging treatment step, the R-T-B based permanent magnet was obtained by carrying out the aging treatment to the obtained sintered body. The aging treatment was carried out in two steps of the first aging treatment and the second aging treatment.

In the first aging treatment, the temperature increasing rate up to the holding temperature was 8.0° C./min, the holding temperature was 900° C., and the holding time was 1.0 hour. The cooling rate when cooled from the holding temperature to the room temperature was 50° C./min. The atmosphere during the first aging treatment was Ar atmosphere.

In the second aging treatment, the temperature increasing rate up to the holding temperature was 8.0° C./min, the holding temperature was 500° C., and the holding time was 1.5 hours. The cooling rate when cooled from the holding temperature to the room temperature was 50° C./min. The atmosphere during the second aging treatment was Ar atmosphere.

(Evaluation)

Magnetic properties of the R-T-B based permanent magnet made from the raw material alloy of each Example and Comparative example were measured by a B—H tracer. As the magnetic properties, Br, Hcj, and Hk/Hcj were measured. Hk in the present examples was the value of the magnetic field when the magnetization was Br×0.9. Results are shown in Table 1. Br and Hcj in Table 1 were an optimum R-T-B based permanent magnet among the three R-T-B based permanent magnets having different holding temperatures. Specifically, these are Br and Hcj of the R-T-B based permanent magnet sintered at the holding temperature of 1060° C.

According to the R-T-B based permanent magnet of the present examples, when Hcj of the above-described optimum R-T-B based permanent magnet was 1450 kA/m or more, it was considered preferable and 1490 kA/m or more was considered more preferable. When Hk/Hcj of all of the R-T-B based permanent magnets having different holding temperatures from 1050° C. to 1070° C. were 97.0% or more, the sintering temperature range was considered preferable, and 98.0% or more was more preferable.

TABLE 1

| | Raw material alloy composition (mass %) | | | | | | | | | | | Magnetic properties | | | | |
|---|---|---|---|---|---|---|---|---|---|---|---|---|---|---|---|---|
| Sample No. | T. RE | Nd | Pr | Al | Co | Cu | Zr | Ga | B | C | Fe | Br (mT) | Hcj (kA/m) | Hk/Hcj (1050° C.) | Hk/Hcj (1060° C.) | Hk/Hcj (1070° C.) |
| Comparative example 1 | 31.20 | 23.94 | 7.26 | 0.37 | 2.00 | 0.30 | 0.50 | 0.45 | 0.83 | 0.10 | Bal. | 1395 | 1548 | 95.0% | 98.4% | 99.0% |
| Example 1 | 31.20 | 23.94 | 7.26 | 0.37 | 2.00 | 0.30 | 0.50 | 0.45 | 0.83 | 0.12 | Bal. | 1398 | 1530 | 97.2% | 98.8% | 99.1% |
| Example 2 | 31.20 | 23.94 | 7.26 | 0.37 | 2.00 | 0.30 | 0.50 | 0.45 | 0.83 | 0.13 | Bal. | 1401 | 1518 | 98.7% | 99.1% | 99.4% |

TABLE 1-continued

| | Raw material alloy composition (mass %) | | | | | | | | | | | Magnetic properties | | | | |
|---|---|---|---|---|---|---|---|---|---|---|---|---|---|---|---|---|
| | | | | | | | | | | | | Br | Hcj | Hk/Hcj | Hk/Hcj | Hk/Hcj |
| Sample No. | T. RE | Nd | Pr | Al | Co | Cu | Zr | Ga | B | C | Fe | (mT) | (kA/m) | (1050° C.) | (1060° C.) | (1070° C.) |
| Example 3 | 31.20 | 23.94 | 7.26 | 0.37 | 2.00 | 0.30 | 0.50 | 0.45 | 0.83 | 0.15 | Bal. | 1401 | 1498 | 98.9% | 99.0% | 99.3% |
| Example 4 | 31.20 | 23.94 | 7.26 | 0.37 | 2.00 | 0.30 | 0.50 | 0.45 | 0.83 | 0.19 | Bal. | 1402 | 1458 | 99.2% | 99.0% | 99.3% |
| Comparative example 2 | 31.20 | 23.94 | 7.26 | 0.37 | 2.00 | 0.30 | 0.50 | 0.45 | 0.83 | 0.21 | Bal. | 1402 | 1438 | 99.2% | 99.0% | 99.3% |

According to Table 1, for Examples 1 to 4 in which compositions of the raw material alloy were within a predetermined range, such as 0.12 mass % or more to 0.19 mass % or less of C content in the raw material alloy, Hcj of the R-T-B based permanent magnets obtained from the raw material alloy was higher and also had a preferable sintering temperature range. For Comparative Example 1 in which C content in the raw material alloy was too small, Hk/Hcj was low in case sintering was performed at a holding temperature of 1050° C., and the sintering temperature range was not preferable. Regarding Comparative Example 2 in which C content in the raw material alloy was too large, Hcj of the R-T-B based permanent magnet obtained from the raw material alloy was lower. Even if C content in the raw material alloy was changed, the change in Br was small.

Experiment 2

In Experiment 2, the raw material alloy having an alloy composition shown in Table 2 was prepared. Then, the amount of the pulverization aid (oleic amide) added was controlled such that C content in the R-T-B based permanent magnet obtained at the end satisfied the value shown in Table 3. The sintering conditions were the holding temperature of 1060° C. and the holding time of 4 hours. Except for the above, the same procedure as in Experiment 1 was performed. The results are shown in Table 3.

TABLE 2

| | Raw material alloy composition (mass %) | | | | | | | | | | |
|---|---|---|---|---|---|---|---|---|---|---|---|
| Sample No. | T. RE | Nd | Pr | Al | Co | Cu | Zr | Ga | B | C | Fe |
| Comparative example 11, 12 | 31.20 | 23.94 | 7.26 | 0.37 | 2.00 | 0.30 | 0.20 | 0.45 | 0.83 | 0.01 | Bal. |
| Example 11, 12 | 31.20 | 23.94 | 7.26 | 0.37 | 2.00 | 0.30 | 0.20 | 0.45 | 0.83 | 0.12 | Bal. |

TABLE 3

| Sample No. | C amount in alloy (mass %) | C amount in magnet (mass %) | Br (mT) | Hcj (kA/m) | Hk (kA/m) | Hk/Hcj (1060° C.) |
|---|---|---|---|---|---|---|
| Comparative example 11 | 0.01 | 0.19 | 1390 | 1552 | 1431 | 92.2% |
| Comparative example 12 | 0.01 | 0.22 | 1392 | 1519 | 1438 | 94.7% |
| Example 11 | 0.12 | 0.19 | 1392 | 1545 | 1520 | 98.3% |
| Example 12 | 0.12 | 0.22 | 1395 | 1513 | 1499 | 99.1% |

According to Tables 2 and 3, although C contents in the R-T-B-based permanent magnets obtained at the end of Examples 11 and 12 and Comparative Examples 11 and 12 were the same, the R-T-B-based permanent magnets of Examples 11 and 12 having a large C content in the raw material alloy had a higher Hk/Hcj than the R-T-B-based permanent magnets of Comparative Examples 11 and 12 to which a large amount of the pulverization aid was added. Note that, Br and Hcj were about the same in the magnets of Examples and Comparative Examples.

What is claimed is:

1. An alloy for R-T-B based permanent magnet in which R is a rare earth element, T is a combination of Fe and Co, and B is boron, wherein
   R comprises one or more selected from Nd, Pr, Dy, and Tb,
   the alloy for R-T-B based permanent magnet comprises M and C,
   M is one or more selected from Al, Cu, Zr, and Ga, and relative to 100 mass % of the alloy for R-T-B based permanent magnet,
   a total content of Nd, Pr, Dy, and Tb is 31.00 mass % or more and 34.00 mass % or less,
   Co content is 0.05 mass % or more and 3.00 mass % or less,
   B content is 0.70 mass % or more and 0.92 mass % or less,
   C content is 0.12 mass % or more and 0.19 mass % or less,
   a total content of M is more than 0 mass % and 4.00 mass % or less, and
   Fe is a substantial balance.

2. The alloy for R-T-B based permanent magnet according to claim 1, wherein C content is 0.12 mass % or more and 0.15 mass % or less.

3. The alloy for R-T-B based permanent magnet according to claim 1, wherein Ga content is 0.20 mass % or more and 1.00 mass % or less.

4. The alloy for R-T-B based permanent magnet according to claim 1, wherein Zr content is 0.10 mass % or more and 1.00 mass % or less.

5. The alloy for R-T-B based permanent magnet according to claim 1, substantially not including rare earth elements other than Nd, Pr, Dy, and Tb.

6. The alloy for R-T-B based permanent magnet according to claim 1, wherein M includes each of Al, Cu, Zr, and Ga.

7. The alloy for R-T-B based permanent magnet according to claim 6, wherein Al content is 0.10 mass % or more and 0.50 mass % or less, Cu content is 0.10 mass % or more and 0.50 mass % or less, Zr content is 0.10 mass % or more and 1.00 mass % or less, and Ga content is 0.20 mass % or more and 1.00 mass % or less.

8. The alloy for R-T-B based permanent magnet according to claim 1, wherein an R-T-B based permanent magnet produced from the alloy has an Hcj of 1450 kA/m or more, and an Hk/Hcj having a holding temperature from 1050° C. to 1070° C. of 97.0% or more.

9. The alloy for R-T-B based permanent magnet according to claim 8, wherein the Hcj is 1490 kA/m or more, and the Hk/Hcj is 98.0% or more.

10. The alloy for R-T-B based permanent magnet according to claim 1, substantially not including rare earth elements other than Nd and Pr.

11. A method of producing the R-T-B based permanent magnet comprising a step of using the alloy for R-T-B based permanent magnet according to claim 1.

12. A method of producing the R-T-B based permanent magnet comprising a step of using the alloy for R-T-B based permanent magnet according to claim 2.

13. A method of producing the R-T-B based permanent magnet comprising a step of using the alloy for R-T-B based permanent magnet according to claim 3.

14. A method of producing the R-T-B based permanent magnet comprising a step of using the alloy for R-T-B based permanent magnet according to claim 4.

15. A method of producing the R-T-B based permanent magnet comprising a step of using the alloy for R-T-B based permanent magnet according to claim 5.

* * * * *